A. JONAS.
APPARATUS FOR THE EVEN DISTRIBUTION OF LIQUIDS.
APPLICATION FILED DEC. 28, 1910.
1,113,643.
Patented Oct. 13, 1914.
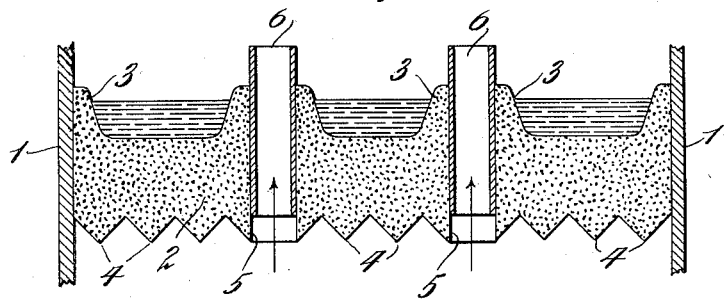
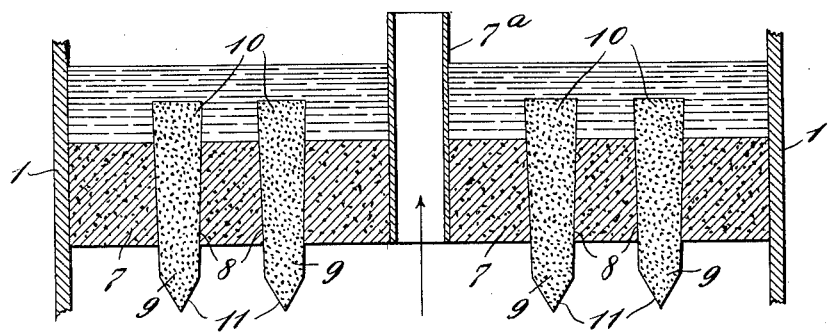

A. JONAS.
APPARATUS FOR THE EVEN DISTRIBUTION OF LIQUIDS.
APPLICATION FILED DEC. 28, 1910.
1,113,643.
Patented Oct. 13, 1914.
2 SHEETS—SHEET 2.
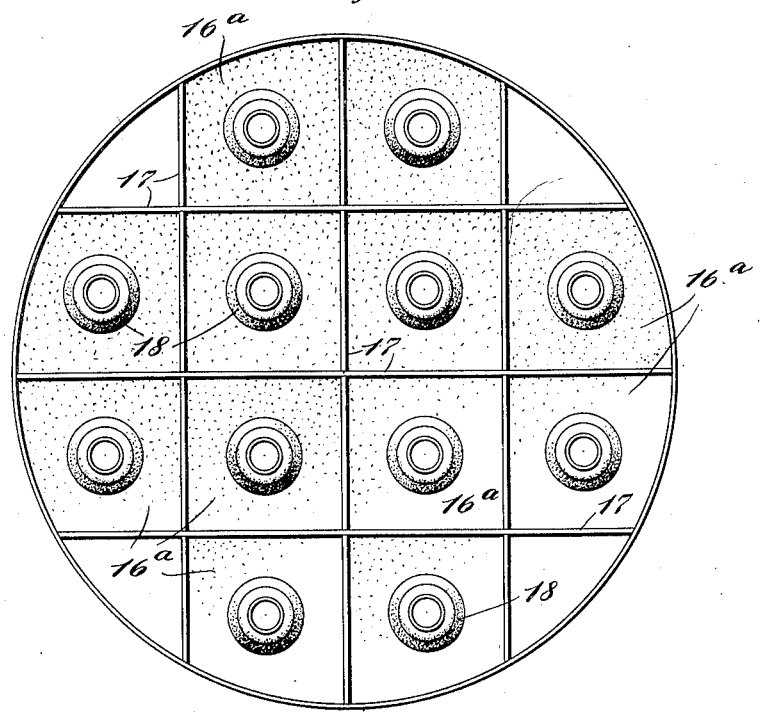
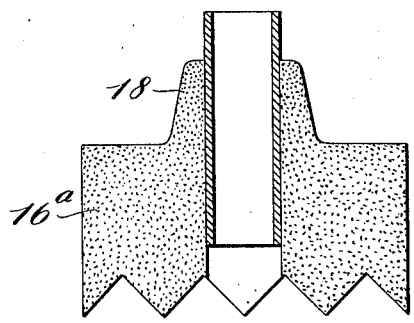

UNITED STATES PATENT OFFICE.

AUGUST JONAS, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

APPARATUS FOR THE EVEN DISTRIBUTION OF LIQUIDS.

1,113,643.   Specification of Letters Patent.   Patented Oct. 13, 1914.

Application filed December 28, 1910.   Serial No. 599,732.

*To all whom it may concern:*

Be it known that I, AUGUST JONAS, citizen of the German Empire, residing at Leverkusen, near Cologne, Germany, have invented new and useful Improvements in Apparatus for the Even Distribution of Liquids, of which the following is a specification.

My invention relates to new and useful improvements in apparatus for the even distribution of liquids, and while it is capable of general application, it is particularly intended for use in connection with chemical apparatus such as acid absorption towers, gas scrubbers and rectification columns in which gases or vapors are to be brought into contact with liquids by causing the liquid to drip in fine particles or streams and be subjected to said gases or vapors while dripping.

I am aware that appliances for the purpose stated have been purposed which include inclined plates, perforated distribution plates with dripping sides, dripping points or projections and dripping tubes from which the liquid is caused to drip, but these have generally been found unsatisfactory where but a small quantity of liquid is to be distributed, due to the fact that the collection of fatty dirt on the distribution elements prevents even distribution of the liquid, and the small openings in the perforated plates or tubes employed are liable to become clogged or even closed by dirt.

I have found that all of the objectionable features referred to are obviated and the even distribution of a body of liquid is obtained if the distributing body be made of a rigid porous granular filter material, such, for instance, as plates, either of a single block or of a plurality of blocks or sections of rigid porous granular material such as burnt clay, ignited quartz, porous cement, or other granular material such as sand or coal-dust bound together into a rigid porous block or plate; and my invention therefore consists in providing a distributing device of porous material having dripping points or projections from which the liquid may drip after having been distributed.

I have fully illustrated my invention in the accompanying drawings to be taken as a part of this application and wherein, Figure 1 is a view in cross section of a structure embodying my invention. Fig. 2 is a similar view of another form of my invention, and Fig. 3 is a top plan view of another form of the invention. Fig. 4 is a sectional view through one of the blocks employed in the construction shown in Fig. 3.

Referring particularly to Fig. 1, 1 designates a surrounding frame 1, within which is secured a distributing plate constructed in accordance with my invention. This distributing plate consists of a horizontally disposed body formed of a porous granular material 2 provided on its upper surface with recesses or pockets 3 to receive the liquid to be distributed, and formed on its under surface with projections 4 which are distributed over the bottom surface of said plate and may be in the form of projections, pins or ribs. Extending through the plate are openings 5 in which are secured flues or pipes 6 through which steam or gas arising from the reaction in the apparatus may rise. In this form of the invention the liquid contained by the pockets 3 passes into the porous granular mass of the plate and is equally distributed therethrough owing to the fact that the same has substantially the same capillarity in all directions and passing down through the plate the liquid emerges at the under surface thereof and flows down the inclined faces of the projections or ribs 5 and drips off the points 6 of said projections. By this arrangement a small body of liquid is equally distributed and drips equally from the under side of the plate.

In Fig. 2 I have shown another form of the same invention, in which the dripping plate 7 is of porous granular material, and is provided with a plurality of openings 8, through which pass pins 9 of porous granular material, the upper ends of which may project above the upper surface of the plate 7 as shown at 10 to afford a large surface exposed to the liquid. The lower ends of the pins project below the under surface of the plate and are formed with pointed lower ends as at 11, from which the liquid entering the pins drips. The porous pins 9 are preferably distributed at equal distances over the entire surface of the plate 7, so that the liquid flows equally from all points of the plate 7. A flue or pipe 7ᵃ may be provided for the gas or vapors.

While I have shown in Fig. 1 a form of the invention in which the distributing body may be formed of a single piece of porous granular material, I desire it understood that the same may be formed of a plurality of sections 16, as shown in Fig. 3, said sections being secured together on a suitable framework of cross members 17. In this form of the invention each of the sections 16ᵃ is provided with a central opening for the escape of the gases, said opening being surrounded by a vertically extending flange 18, to prevent the liquid on the upper surface of the body from passing down through said opening. It will be understood that the sections are so mounted on the frame members that the liquid cannot leak between the sections.

By changing the size of the grain or the porosity of the porous body and the height of the material on the distribution plates, the velocity of dripping may be regulated as desired.

By the use herein and in the claims of the term "porous granular material" I intend to include any materials heretofore set forth, or their equivalents, in the form of a rigid porous granular block or plate.

I claim:—

1. A liquid distributing means consisting of a rigid porous body adapted to support a liquid on its upper surface and being provided with a plurality of dripping projections depending from the under surface thereof, and having free lower ends, said body and projections being formed of rigid porous material with the interstices of the projections in communication with the interstices of the body.

2. A liquid distributing means consisting of a rigid body adapted to support a liquid on its upper surface and provided with dripping projections depending from the under surface thereof and having free lower ends, said rigid body having open passages extending therethrough to above the normal level of liquid on said body for permitting the free upward passage of gases through said body, said body and projections being formed of rigid porous granular material with the interstices of the projections in communication with the interstices of the body.

3. A liquid distributing means consisting of a rigid porous body adapted to support a liquid on its upper surface and made up of a plurality of rigid porous blocks, each of said blocks being provided with dripping projections depending from the under side thereof and having open passages extending therethrough to above the normal level of liquid on said body for permitting the free upward passage of gases through said body, and said blocks and projections being formed of rigid porous granular material with the interstices of the projections in communication with the interstices of the body.

In testimony whereof I have hereunto set my hand in the presence of two subscribing witnesses.

AUGUST JONAS. [L. S.]

Witnesses:
ALFRED HENKEL,
WALTER VONNEGUT.